(12) United States Patent
Shemelya et al.

(10) Patent No.: US 11,820,056 B2
(45) Date of Patent: Nov. 21, 2023

(54) HYBRID MOLDING WITH SELECTIVE RELEASE ADDITIVE MATERIAL SYSTEMS

(71) Applicant: University of Massachusetts, Boston, MA (US)

(72) Inventors: Corey M. Shemelya, Salem, NH (US); Davide Masato, Lowell, MA (US)

(73) Assignee: University of Massachusetts, Boston, MA (US)

( * ) Notice: Subject to any disclaimer, the term of this patent is extended or adjusted under 35 U.S.C. 154(b) by 481 days.

(21) Appl. No.: 16/934,427

(22) Filed: Jul. 21, 2020

(65) Prior Publication Data

US 2021/0023750 A1    Jan. 28, 2021

Related U.S. Application Data

(60) Provisional application No. 62/876,871, filed on Jul. 22, 2019.

(51) Int. Cl.
| | |
|---|---|
| *B29C 45/00* | (2006.01) |
| *B29C 45/14* | (2006.01) |
| *B29C 64/112* | (2017.01) |
| *B33Y 80/00* | (2015.01) |
| *B29C 71/02* | (2006.01) |
| *B33Y 10/00* | (2015.01) |
| *B29L 31/34* | (2006.01) |

(52) U.S. Cl.
CPC ........ *B29C 45/1418* (2013.01); *B29C 64/112* (2017.08); *B29C 71/02* (2013.01); *B33Y 10/00* (2014.12); *B33Y 80/00* (2014.12); *B29L 2031/3493* (2013.01)

(58) Field of Classification Search
CPC ............ B29C 45/1481; B29C 45/1418; B29C 64/112; B29C 71/02; B33Y 10/00; B29L 2031/3493
See application file for complete search history.

(56) References Cited

PUBLICATIONS

Giusti, R.et al. ("Analysis of the welding strength in hybrid polypropylene composites as a function of the forming and overmolding parameters." Polym. Eng. Sci. 2017, 58, 592-600). (Year: 2017).*
Lu, et al. ("Direct-print/cure as a molded interconnect device (MID) process for fabrication of automobile cruise controllers." J. Mech. Sci. Technol. 2015, 29, 5377-5385). (Year: 2015).*

* cited by examiner

*Primary Examiner* — Larry W Thrower
(74) *Attorney, Agent, or Firm* — Armis IP Law, LLC

(57) ABSTRACT

A method for additive manufacturing using releasable inks on a substrate mold includes applying a surface treatment to a surface of a mold defining an article for manufacturing, and depositing an ink including particles or fibers of a trace material onto the surface treatment. The particles are coated with a functionalization agent based on a surface energy of the surface treatment for providing a release on demand of the printed trace. The deposited ink is cured to evaporate a solvent carrier, and sintered to bond or melt the particles or fiber together r. The article is molded by adding a molding substance to the mold over the trace, and releasing the molded article from the mold, such that the trace adheres to either the mold or the article based on the functionalization agent providing the trace greater adhesion to the mold or the article to effect the release on demand.

16 Claims, 4 Drawing Sheets

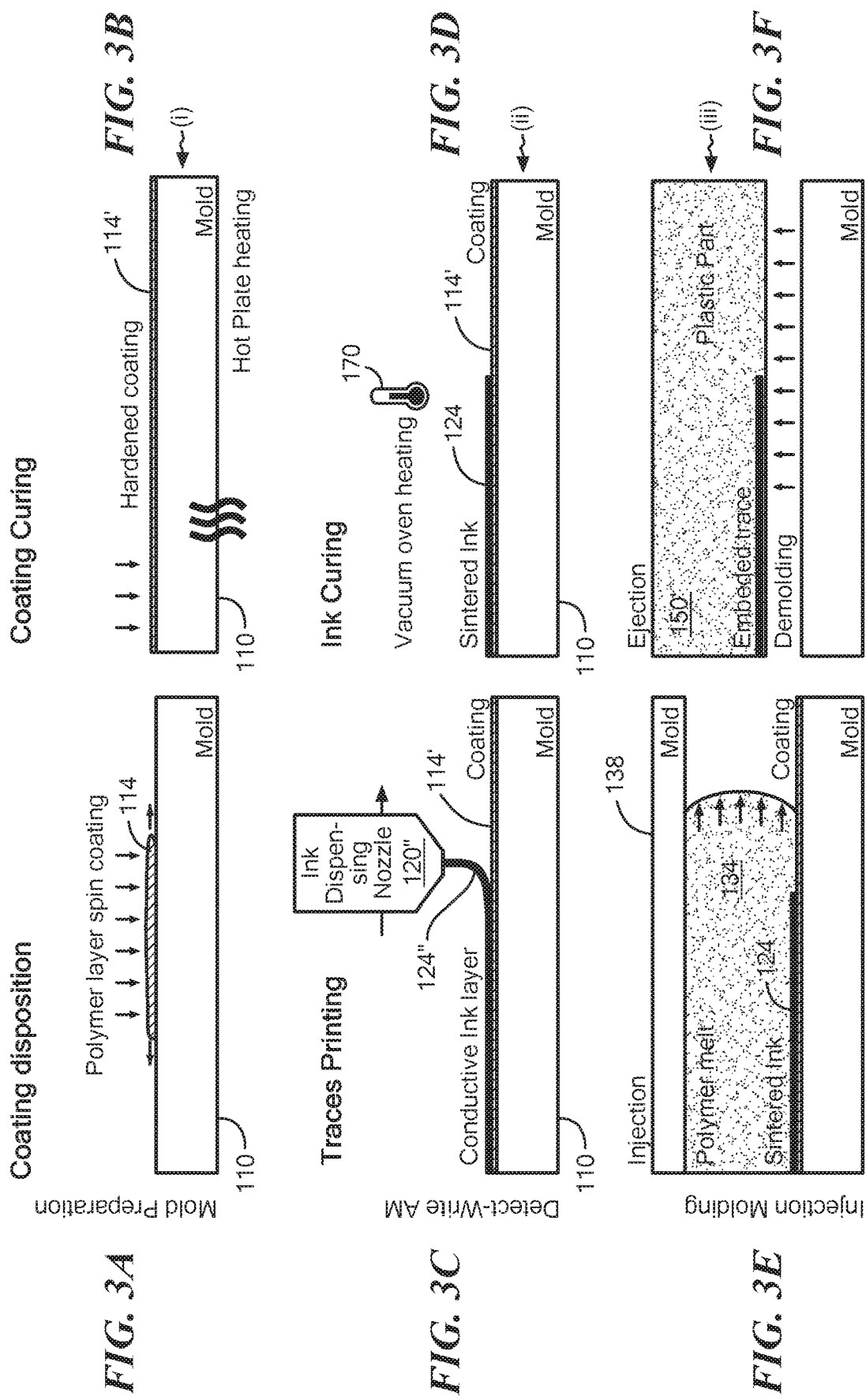

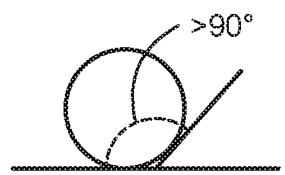
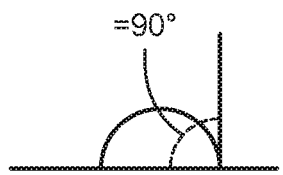
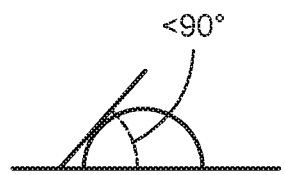
*FIG. 4A*    *FIG. 4B*    *FIG. 4C*
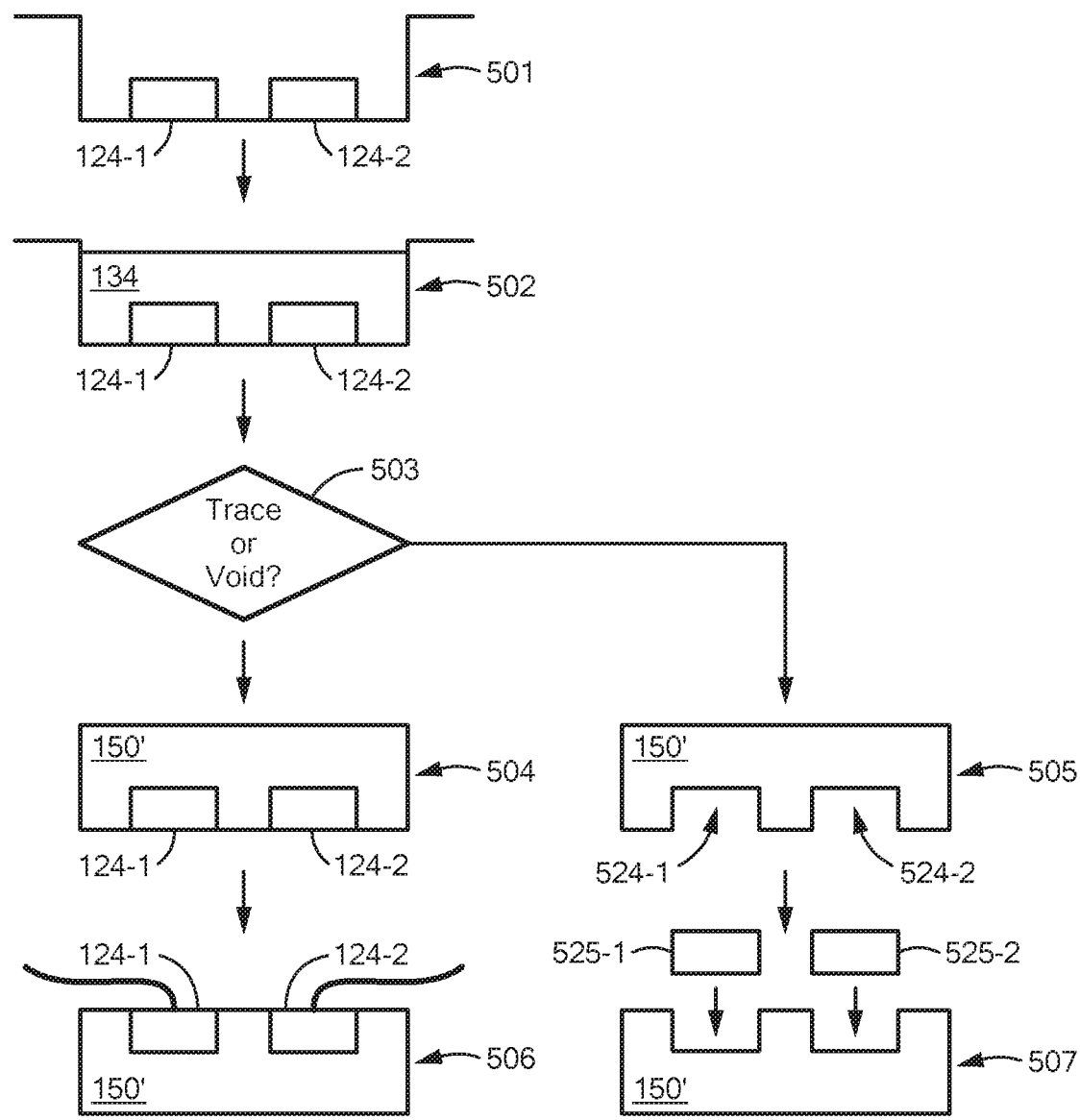
*FIG. 5*

HYBRID MOLDING WITH SELECTIVE RELEASE ADDITIVE MATERIAL SYSTEMS

RELATED APPLICATIONS

This patent application claims the benefit under 35 U.S.C. § 119(e) of U.S. Provisional Patent App. No. 62/876,871, filed Jul. 22, 2019, entitled "IMPROVED ADHESION FOR 3-D PRINTING MATERIAL," incorporated herein by reference in entirety.

BACKGROUND

Computer driven printing technology has evolved in recent decades from impact-based typewriter extensions to laser guided powder (toner) deposited on a print medium. Ink jet printers evolved to form a fine spray of ink based first on letter patterns in text, and subsequently for graphics and photographic renderings. More recently, the concept of sprayed inks merged into additive manufacturing by recognizing that the sprayed liquids were extendable to inclusions of various materials other than visual pigments, and could be manipulated to a fine degree using similar fluidic transfer mediums, also known as direct-write methods.

SUMMARY

An additive manufacturing process allows printing of patterns, traces, and other structures on an article before formation of said article by printing or depositing the pattern on the surface of an mold prior to molding in order to avoid post-processing of the article to add the traces or features to an already molded article. Alternate approaches may apply the configurations herein to various molded or cast fabrication mediums in addition to various polymers, such as epoxy, concrete, ceramic. The direct-write additive manufacturing or printing techniques used herein employ a fluidic, sprayable, or dispensable form of the desired deposition material directly onto the mold. A surface treatment or release agent on the mold and a functionalization agent surrounding particles in the fluid ink are selected to allow the fluidized particles to adhere to the mold before injection and the molded article, rather than the mold, after molding. Alternatively, voids in the article can be created by favoring adhesion to the mold surface after molding. Circuits, structures, and other features may be deposited or "printed" onto the mold prior to fabrication of the article by molding, for example, and result in the molded article with the printed traces volumetrically integrated upon release of the molded article from the mold.

Configurations herein are based, in part, on the observation that polymeric material handling systems such as injection molding are a preferred process for mass production of polymer articles requiring fidelity to manufacturing specifications. Precision molds embodying a desired article allow article molding with a high degree of fidelity and consistency based on the engineered dimensions reflected in the mold. Unfortunately, conventional approaches to integrate injection molding and additive manufacturing require that the molded article emerge first, followed by post-processing of any additive structures such as traces, patterns, or other features that may be added. Accordingly, configurations herein eliminate the need for post-processing by performing a direct-write of the integrated features onto a mold surface used to fabricate the resulting article.

In the case of circuit traces for example, electronic and/or mechanical stability are imparted to the molded article without subjecting the molded article to post-processing chemicals and heat which might compromise integrity of the finished article. Development of the deposited system, which may be any suitable fluidic or paste transfer such as screen printing, aerosol jetting, ink-jetting, embedded wires, dispensing, flexography, stamping, and gravure systems, defines a strong ink/polymer binding that exceeds that of the polymer/mold adhesion interface, causing the printed structure to release from the mold with the article. The disclosed approach is particularly beneficial the area of Molded Interconnected Devices (MIDs), which are typically thermoplastic injection-molded parts with integrated metallic circuit traces that combine electrical and mechanical functionalities in a single assembly.

The disclosed approach combines traditional polymer manufacturing technologies that are based on melt replication with additive techniques such as aerosol jetting, dispensing, micro-dispensing, stamping, flexography, gravure, and screen printing. In one example, direct-write printing methods may be integrated with non-isothermal polymer flows. The direct-write materials will undergo a "release and transfer" process for integration into polymeric material systems. To accomplish these goals, it is important to identify the fundamental material interactions under processing conditions to develop the insight needed to predict polymer/traces interfacial bonding.

Predictive modeling may be employed to allow arbitrary plastic manufacturing techniques with integrated direct-write "transfer" material systems. The resulting "hybrid" structure demonstrates increased multi-material adhesion, surface finish, and long-term stability, when compared to conventional post-processed additive print-on-part systems. Additional embodiments employ these particle systems for both structural re-enforcing agents, mechanical strengtheners, and/or structural electrics, depending on the ink properties. Microstructural properties of the ink nanoparticles or ink-based fibers may improve structural integrity for applications such as compression, or impact resistance without the need for polymer matrix composites or fiber reinforced systems.

In further detail, the method for additive manufacturing using releasable inks on a substrate mold includes applying a surface treatment to a surface of a mold that defines an article for manufacturing, and depositing an ink including particles or fibers of a trace material onto the surface treatment in the mold. The ink contains particles or fibers which are coated with a functionalization agent based on a surface energy of the surface treatment for providing a "release on demand" of the printed trace. The deposited ink is cured to evaporate a solvent carrier, and sintered to bond or melt the particles or fibers to each other within the trace. The resulting trace forms a continuous, agglomerated or homogeneous arrangement of the particles. This continuous arrangement results from close engagement or bonding of the particles transported by the ink, suitable for electrical continuity in the case of electric traces, and otherwise suitable for an unbroken sequence of particle material for creating voids or other solid structure within the mold. The article is molded by adding a molding substance to the mold over the continuous trace, and releasing the molded article from the mold, such that the trace adheres to either the mold or the article based on the functionalization agent providing the trace greater adhesion to the mold or the article to effect the release on demand.

In an example of electrical trace fabrication on a circuit board substrate, the method of forming a circuit on an injection molded substrate includes printing a trace pattern defining a circuit on a mold surface of an injection mold, and injection molding the substrate by injecting a molten polymer into the mold. Upon removal of the molded substrate from the mold, the printed trace pattern defining the circuit releases from the mold surface and adheres to the molded substrate based on a greater adhesion between the trace and the substrate than between the trace and the mold surface.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A-3F show a side cutaway view of the molded article of FIGS. 1 and 2 during molding;

FIGS. 4A-4C show surface geometries resulting from defining a release on demand property in the molded article of FIGS. 3A-3F; and FIG. 5 is a flowchart for producing a molded article in the environment of FIG. 1.

DETAILED DESCRIPTION

Examples discussed below employ direct-writing Additive Manufacturing (AM) technology to additively deposit conductive features on a mold surface. The printed traces undergo a transfer process into the polymeric part during the molding process. The volumetric integration of printed features into plastic parts is enabled by controlling the relative plastic/ink and mold/ink interfacial strengths. This process can also be further enhanced through the use of engineered mold surface properties and coatings.

The use of conductive inks printed onto mold materials relies on interface interactions involved in the printing and molding process. The creation of a quality ink/mold interface is a significant parameter for achieving consistent printing. However, the ink/polymer interface should be stronger, to enable the final "transfer" to the plastic part defining the molded article. The ink/polymer interface is controlled by a variety of phenomena, including surface roughness, surface energy, and processing conditions. In particular, high surface roughness has been shown to promote stronger interfacial interactions. For these high roughness interfaces, the polymer melt has the capability of entering topographical voids, increasing the surface contact area between the melt and mold. These interfaces are strongly defined by differences in surface energy (i.e. polar and a-polar components) between two materials. The design of the material systems involved at these interfaces allows achievement of stronger or weaker surface adhesion depending on the similarities between polar and a-polar components of materials surface energy.

In the configurations below, a hybrid molding process chain is developed for production of plastic parts with embedded silver traces using an AM direct-writing process known as micro-dispensing. The process chain enables the combination of ink dispensing technologies with plastic injection molding, establishing a novel compromise between productivity and flexibility. Specifically, nano-particle ink is printed, cured, and sintered before exposure to the polymer melt. After molding, the ink systems are embedded in the polymer parts and released from the mold surface due to a customized ink/polymer interface with differential polymer shrinkage. Interactions at the mold/ink/polymer interfaces relate topography parameters, surface energy, and contact angle of the hot polymer melt.

Figure 1:
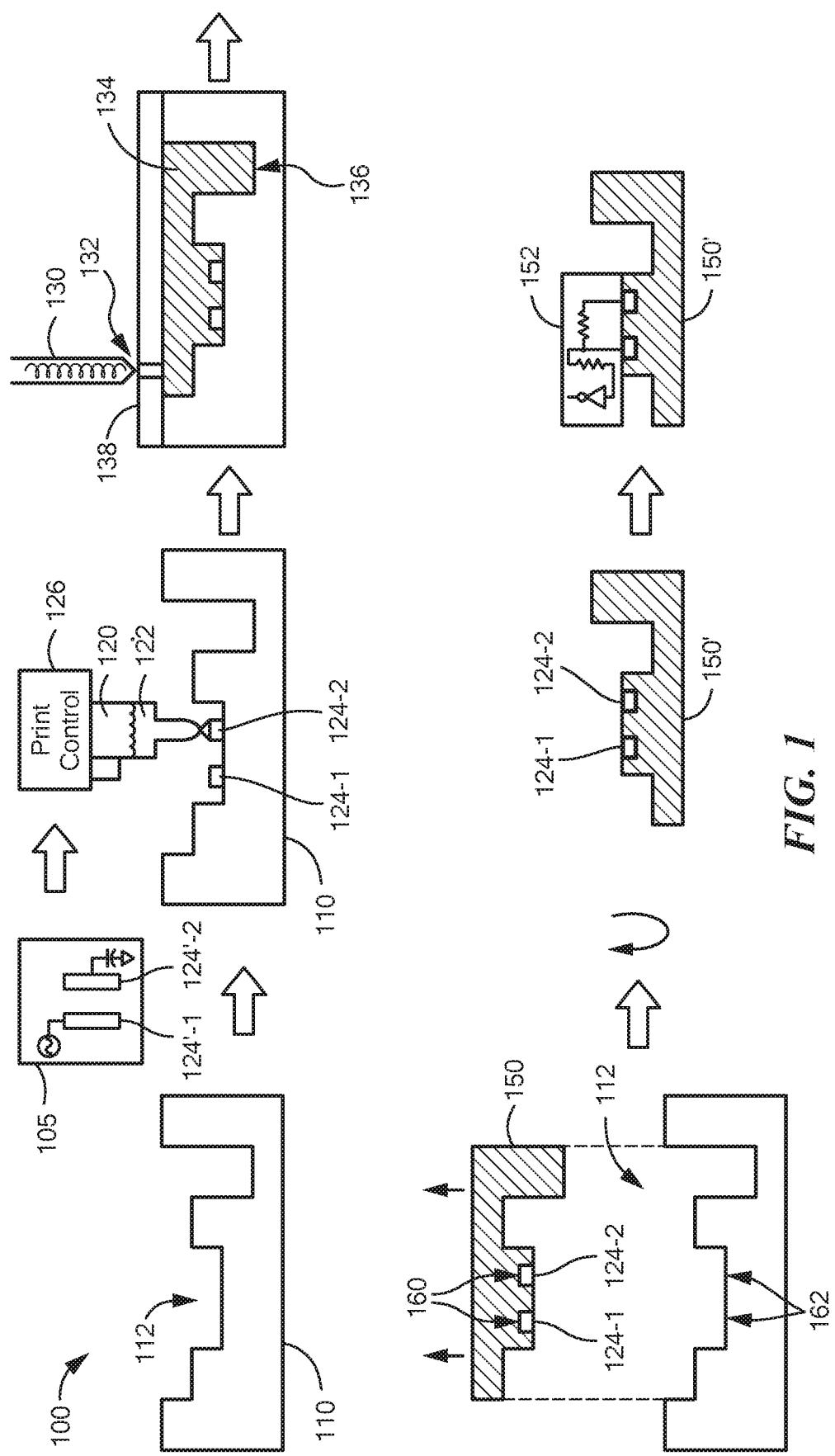
FIG. 1 is a context diagram of a molding environment suitable for use with configurations herein.

FIG. 1 is a context diagram of a molding environment suitable for use with configurations herein. Referring to FIG. 1, in a manufacturing environment, polymeric materials combined with additive manufacturing complement to provide cost effective automation for manufactured articles. In a particular example, injection molding combined with ink-deposited, or "printed" traces allow fabrication of circuit elements that become integrated with the finished molded article (product). Other molded polymeric systems may benefit from the "release-on-demand" properties espoused by the deposited inks, and features other than circuit traces may be printed, however a circuit trace demonstrates the mechanical and electrical stability of the finished article.

In an additive manufacturing environment 100, a mold 110 is formed from a suitable mold material such as stainless steel. A circuit design 105 received by print control 126 specifies instructions for printing circuit traces 124'-1 . . . 124'-2 based on locations defined in the circuit design 105. A print medium, such as a dispensing needle 120 or other suitable fluid deposition or application mechanism (spray, or inkjet) deposits traces 124-1 . . . 124-2 (124 generally) of an ink fluid or paste 122 onto the mold surface 110 based on the positions called for by the circuit design 105. Once printed, the mold 110 is sealed as appropriate with a closure 138 and an injection molding nozzle 130 engaged with a mold feeding system 132. The injection molding nozzle injects molten polymer 134, typically at high pressure, into a mold cavity 136 defined by the sealed mold 110 and 138.

Once solidified, the mold 110 expels the molded article 150. An adhesive interface 160 between the molded article 150 and the traces 124 is stronger than an adhesive interface 162 between the molded article 150 and the mold 110. This causes the adhesive interface 162 to release and leave the circuit traces 124 embedded in the molded article 150 and integrated on the surface. Surface energies resulting from the sprayed ink 122 and the mold surface 112 allow control of these interfaces for selective release. Voids may also be created by causing the adhesive interface 162 to be stronger than the adhesive interface 160.

In alternate arrangements, discussed further below, the mold 110 may be covered with a thin surface treatment layer to improve surface energy matching between the printed trace 124, the mold surface 110, and the molded polymer 150. Such a surface treatment may improve removal of the trace 124 at the adhesive interface 162. The surface treatment may aid either trace retention or void formation. The surface treatment can be deposited using any suitable liquid phase deposition method described for ink, fluid, or paste deposition, and may benefit from an in-situ cure prior to deposition of the traces 124.

Following release, the molded article 150' may be inverted for attachment of additional features, devices or connected circuits 152 that attach or contact the traces. This allows the molded article 150' to emerge with circuits and other features already integrated, rather than applied by post-processed direct-writing, electroplating, physical vapor deposition, glues, cutting and/or drilling that might be required. In a particular configuration, the molded article 150 may be a PCB (Printed Circuit Board) adapted for interconnection with other circuit elements.

Figure 2:
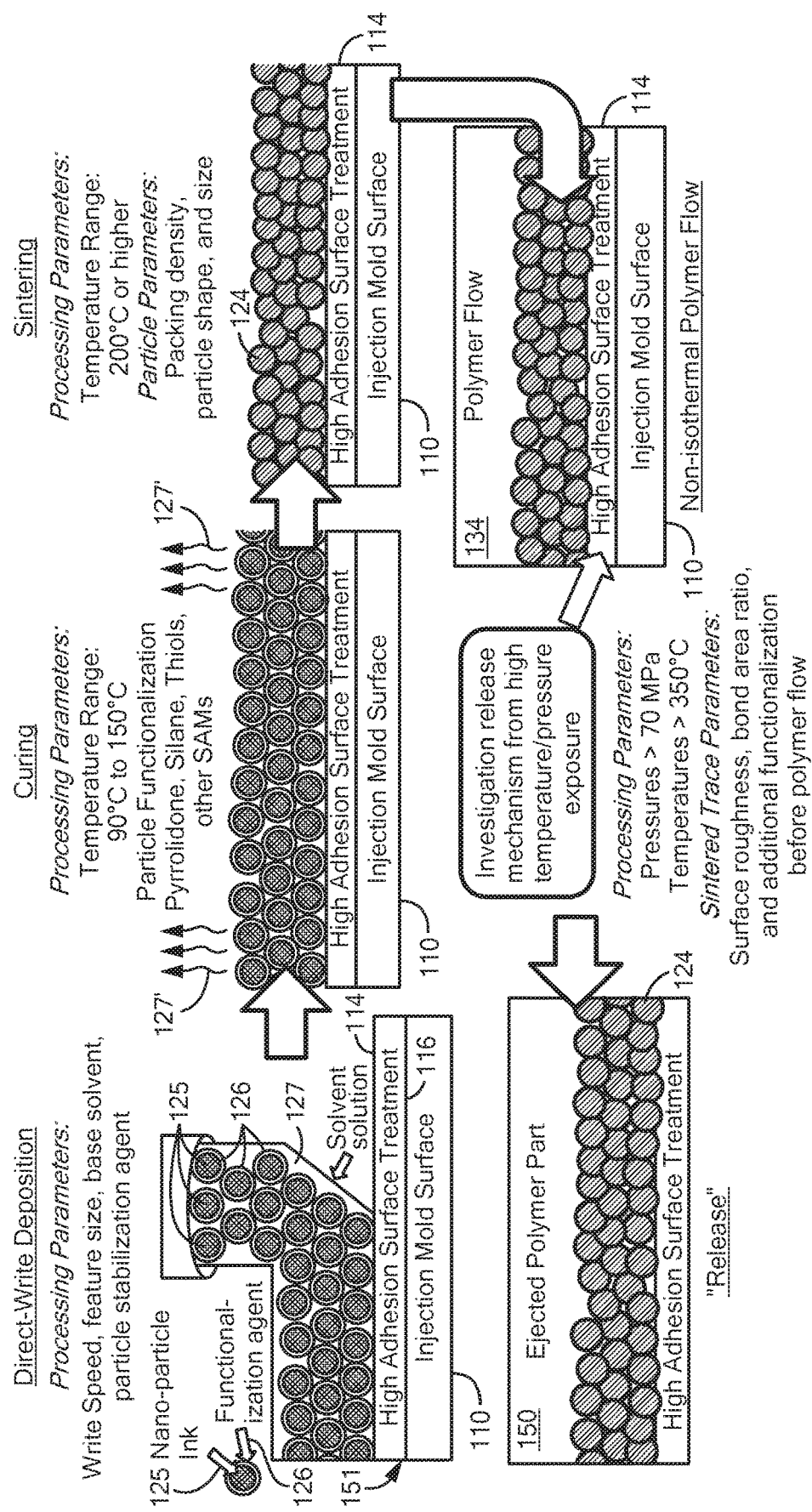
FIG. 2 is a process diagram of the direct-write and injection molding process in the environment of FIG. 1.

FIG. 2 is a process diagram of a molding process in the environment of FIG. 1. Referring to FIGS. 1 and 2, the disclosed method for additive manufacturing using releasable inks on a substrate mold includes applying a surface treatment 114 to a surface 116 of the mold 110 defining an article for manufacturing. The ink 122 is formed from particles 125 of a trace material surrounded by a functionalization agent 126, adding a solvent carrier 127 for defining the ink 122 in a fluid form adapted for deposition on the mold surface 116. The surface treatment 114 therefore defines an interface 151 between the ink particles 125 and the mold 110.

The spray or deposition process deposits the ink 122 including particles 125 of the trace material onto the surface treatment 114 on the mold surface 116. The particles 125 remain coated with the functionalization agent 126 based on a predetermined surface energy of the surface treatment 114 so as to result in the expected adhesion.

Formulation of the ink 122, discussed further below, includes coating a nanoparticle ink with the functionalization agent 126 based on a surface energy of the surface treatment 114. The functionalization agent 126 is selected based on promoting a higher adhesion between the molded article 150 and the trace 124 than the adhesion between the mold 110 and the trace 124. The illustrated example involves spraying the ink 122 on the mold surface 116 (coated with the surface treatment 114) according to the trace 124' pattern of an electrical circuit 105.

Once sprayed, time is provided for curing the deposited ink to evaporate the solvent carrier 127, shown by arrows 127.' Sintering the deposited ink bonds or melts particles 125 or fibers together within the trace 124 of material. The functionalization agent 126 is responsive to sintering for defining a stronger adhesion between either the mold to trace or the trace to molded article.

A molding substance such as molten polymer 134 is added or injected to the mold to flow over the trace 124 and form the article 150. The molded article 150 is then released from the mold 110, such that the trace 124 adheres to the article based on the functionalization agent 126 providing the trace greater adhesion to the article 150. In the circuit fabrication example show, release of the molded article 150 from the mold 110 results in the trace 124 adhering to the molded article 150 based on a higher adhesion between the trace 124 and the molded article 150 than between the trace 124 and the mold 110. Alternate configurations employ a surface treatment 114 and functionalization agent 126 for greater adhesion to the mold surface 116 for creating voids.

The ink 122 is designed to control particle surface energy to simultaneously provide good adhesion and reliable release. A further feature is the use of sintered particle or fiber systems can act as both structural re-enforcing agents, and/or structural electrics, depending on the intended use of the molded article 150. In general, the ink defines a granularized form of material for forming into a trace and combined with a fluidization medium responsive to pressure for forming a flow for deposition or spraying. The printed ink 122 may be developed for a multitude of uses; such inks are not limited to electrically conductive materials. Any suitable materials compatible with a molding process may be incorporated to reach a variety of applications depending on desired outcome. Features that are beneficial to a release-on-demand approach include ink particle size, particle-polymer functionalization, particle thermal conductivity, and ink fusion temperature.

The examples herein depict beneficial uses for an injection molding/deposited ink system. Various printable ink properties are may be applied based on their intended end applications. For example, silver, copper, and gold-based inks have beneficial electrical properties; Ruthenium and Barium Strontium Titanate inks may be employed for dielectric/electromagnetic properties; and carbon-based particle or fiber inks may be directed to electrochemical applications or mechanical properties. Molded articles 150 with printable inks may also be employed to exhibit properties such as luminescence for security ink applications (yttrium borate), biomaterials such as silk fibroin, and printed batteries using $Li_4Ti_5O_{12}$ (LTO) and $LiFePO_4$ (LFP), and cellulose direct-write materials may be employed for material systems printable in multiple dimensions.

FIGS. 3A-3F show a section view of the molded article of FIGS. 1 and 2 during molding using ink 122 as disclosed above. Referring to FIGS. 1-3F, the molding process chain follows three primary processing steps: (i) mold preparation, (ii) direct-write AM and (iii) injection molding. In mold preparation (FIGS. 3A-3B), the mold 110 is first pre-treated using a solvent/polymer solution as the surface treatment 114, which is deposited on the mold surface 116 where the ink will be printed. The surface treatment 114 ensures high-quality printing and improves release to the polymer system during the injection molding process. In the illustrated example, the mold is pretreated with an ABS (Trilac® ABS-MP1000 Polymer Technology and Services, LLC, Heath, Ohio, USA) solvent solution. The typical coating process would include solution-based spin coating, alternatively, spray coating techniques to compensate for mold size and/or weight constraints. In FIG. 3B, the resulting mold surface 116 maintains a thin, uniform, polymer coating 114' directly on the stainless-steel mold surface 116. After coating, the mold is heated on a hot plate to remove excess solvent and harden the coating 114'. The surface treatment is designed and used to improve relative surface energies, enabling an optimal mold/ink interface 151 for molding "transfer."

In step (ii), direct-write AM (FIGS. 3C-3D): the printing process is carried out using an ink micro-dispensing system. The dispensing nozzle 120 may be adjusted for multiple trace dimensions with the resulting feature sizes dependent on the selected ink, the deposition rate, and curing methods. The illustrated example employs a silver nanoparticle ink (DuPont® CB 028) as being beneficial for printed electronics. Printing is executed on the pre-treated mold surface 116 using an automated micro-pen dispensing system (Nordson Pro4 EPD). Each trace was printed in the form of a line with a design length of 20 mm, and a design height of 50 μm.

Once printed, the ink is as cured/sintered in FIG. 3D in a vacuum oven 170. It should be noted that other curing methods could be used including laser curing and photonic curing. The example employs the vacuum oven (Isotemp, 282A) for sintering at 220° C. for 30 min.

At step (iii), injection molding (FIGS. 3E-3F), the mold 110, with the printed/sintered traces 124, is assembled into an injection molding machine for processing. The injected molten polymer 134 is injected over the trace 124 structures and the rapid cooling forms a strong bond between the melt 134 and ink (trace) 124. The final polymer article 150 with integrated traces was then ejected from the mold, resulting in a hybrid, composite article 150'.

Defining the intended trace release properties of the printed trace includes selecting or engineering surface energies of the surface treatment and the functionalization agent for a release on demand from either the mold or the article upon unmolding of the article. The sintered trace 124 defines a first adhesion interface between the ink particles 125 and the mold surface 116, and a second adhesion interface between the ink particles 125 and the molten polymer 134 or other molding substance. This includes selecting the surface treatment 114 and the functionalization agent 126 based on resulting surface energies of the trace 124 material and the surface treatment on the mold surface.

The adhesion at the ink/mold and ink/polymer interfaces may be evaluated by quantifying the surface energy for the different materials involved in the process chain. Surface energy is measured using a drop shape analyzer (DSA 100, KRÜSS GmbH). Two different liquids (water and diiodomethane) are employed for the estimation of surface energy based on the extended Fowkes' two-liquids in contact model. Example measurements may be provided based on the following substrates: mold-polished steel, mold-steel pre-treated for printing, sintered ink, and ABS molded parts in a trace-free area.

The effect of injection molding on the creation of a strong polymer/ink interface may be evaluated by measuring the contact angle of the hot polymer melt 134 over the mold surface. Such tests may be performed using the drop shape analyzer on which a high-temperature syringe dosing unit (Kruss TC21) and measuring cell (Kruss, TC3213) are mounted. Contact angle measurements may be performed using printed/sintered ink and hot ABS at injection molding melt temperature (i.e. 260° C.).

FIGS. 4A-4C show surface geometries resulting from defining a release on demand property in the molded article of FIGS. 3A-3F. In particular configurations, the functionalization agent 126 directs a predetermined wetting angle of the ink particles. In FIG. 4A, a contact angle of greater than 90° defines a particle mostly riding above the surface. FIG. 4B shows a 90° contact angle, and in FIG. 4C an acute contact angle of <90° indicates a "wetting" of the contact surface, as opposed to a "beading" tendency of FIG. 4A.

Therefore, interaction between mold surface coatings and printed ink may be approached using a variety of ink formulations and surfaces. Interactions between different inks and different coatings including dielectric coatings (Silicon Nitride and Silicon Dioxide), metallic finishes (Chrome, Chrome-Nickle), and polymeric-based coatings (saturated polymeric solutions) may be evaluated through wettability tests. Some ink additives are able to be removed under the correct conditions aiding in the "release on demand" feature. As such, creating mold interfaces which are amenable to these agents may also improve printing adhesion and quality.

FIG. 5 is a flowchart for producing a molded article in the environment of FIG. 1. The example shows circuit traces on an injection molded substrate as the finished article Referring to FIGS. 1-5, the method of forming a circuit on an injection molded substrate 150' includes printing a trace pattern defining a circuit on a mold surface of an injection mold, as shown at step 501. This encompasses the approach discussed above by mixing an ink including particles of the trace material surrounded by a functionalization material and combined with a solvent carrier, curing the ink to remove a solvent carrier in the ink, and sintering the mold from a heating source to fuse particles in the printed trace pattern based on the circuit 105 design or other schematic.

At step 502, the substrate is injection molded by injecting a molten polymer 134 into the mold. At step 503, a check is performed to determine if embedded traces or open voids are intended in the finished article 150. If traces 124 are intended, the molded substrate is removed from the mold 110, such that the trace pattern defining the circuit releases from the mold surface and adheres to the molded substrate 150' based on a greater adhesion between the trace and the substrate than between the trace and the mold surface, as shown at step 504. Alternatively, at step 505 the demolding forms voids 524-1 . . . 524-2 (524 generally) with the trace printing based on selection of a functionalization agent 126 and surface treatment 114 to provide a greater adhesion between the mold 110 and the trace than between the trace and the article 150.

The decision branch at step 503 is based on selecting the functionalization agent and the mold surface treatment to control the adhesion interfaces between the mold and the trace material and the trace material and the article.

Additional or more complex trace structures of solid trace by iterating a deposition of a plurality of layers of the deposited ink.

At step 506, wires 552 or other electrical connections may be made to the embedded, molded traces 124. Alternatively, additional components 525-1 . . . 525-2 may be added to fill the voids 524.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for additive manufacturing using releasable inks on a substrate mold, comprising:
    applying a surface treatment to a surface of a mold, the mold defining an article for manufacturing;
    depositing an ink including particles of a trace material onto the surface treatment, the particles coated with a functionalization agent based on a surface energy of the surface treatment;
    curing the deposited ink to evaporate a solvent carrier;
    sintering the deposited ink to form a continuous, printed trace of the trace material;
    molding the article by adding a molding substance to the mold over the printed trace; and
    releasing the molded article from the mold, the printed trace adhering to either the mold or the article based on the functionalization agent providing the printed trace greater adhesion to the mold or the article.

2. The method of claim 1 further comprising:
    forming the ink from particles of the trace material surrounded by the functionalization agent; and
    adding the solvent carrier for defining the ink in a fluid form adapted for deposition on the mold surface.

3. The method of claim 1 further comprising releasing the molded article from the mold, the printed trace adhering to the molded article based on a higher adhesion between the printed trace and the molded article than between the printed trace and the mold.

4. The method of claim 3 further comprising selecting the functionalization agent based on promoting a higher adhesion between the molded article and the printed trace than the adhesion between the mold and the printed trace.

5. The method of claim 3 further comprising depositing the ink in the mold surface according to a trace pattern of an electrical circuit.

6. The method of claim 1 wherein the functionalization agent is responsive to sintering for defining a stronger adhesion between either the mold to the printed trace or the printed trace to the molded article.

7. The method of claim 6 wherein the functionalization agent directs a predetermined wetting angle of the ink.

8. The method of claim 1 further comprising selecting the functionalization agent and the mold surface treatment to control the adhesion interfaces between the mold and the trace material and the trace material and the article.

9. The method of claim 8 further comprising defining surface energies of the surface treatment and the functionalization agent for a release on demand from either the mold or the article upon unmolding of the article.

10. The method of claim 1 wherein the ink further comprises fibers, and wherein the printed trace defines a first adhesion interface between the ink particles and fibers and the mold surface, and a second adhesion interface between the ink particles and fibers and the molding substance.

11. The method of claim 10 further comprising selecting the surface treatment and the functionalization agent based on surface energies of the trace material and the surface treatment on the mold surface.

12. The method of claim 1 further comprising defining a structure of solid trace by iterating a deposition of a plurality of layers of the deposited ink.

13. The method of claim 2 further comprising forming voids with the printed trace by selecting a functionalization agent and surface treatment to provide a greater adhesion between the mold and the printed trace than between the printed trace and the article.

14. The method of claim 1 wherein the ink further comprises fibers, and wherein the surface treatment defines an interface between the ink particles and fibers and the mold.

15. The method of claim 14 further comprising coating a particle or fiber-based ink with a functionalization agent based on a surface energy of the surface treatment.

16. The method of claim 1 wherein the ink defines a granularized form of material for forming into a trace and combined with a fluidization medium responsive to pressure for forming a flow for deposition or spraying.

* * * * *